United States Patent
Morel et al.

(10) Patent No.: US 6,695,359 B2
(45) Date of Patent: Feb. 24, 2004

(54) DEVICE FOR CENTERING AND GRIPPING, PARTICULARLY FOR PIECES OF AUTOMOBILE BODY WORK

(75) Inventors: Michel Morel, Ermont (FR); Fabrice Roudier, Juziers (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 09/780,521

(22) Filed: Feb. 12, 2001

(65) Prior Publication Data

US 2001/0013164 A1 Aug. 16, 2001

(30) Foreign Application Priority Data

Feb. 11, 2000 (FR) .............................. 00 01712

(51) Int. Cl.[7] .............................................. B23Q 1/00
(52) U.S. Cl. ........................................ 289/49; 269/244
(58) Field of Search ............................. 269/32, 34, 49, 269/52, 47, 93, 24, 246, 247, 244; 279/2.06, 2.09

(56) References Cited

U.S. PATENT DOCUMENTS

| 3,704,879 A | * | 12/1972 | Nishikawa | 269/222 |
|---|---|---|---|---|
| 4,102,372 A | * | 7/1978 | Cremona | 269/244 |
| 4,635,911 A | * | 1/1987 | Lovrenich | 269/224 |
| 4,700,936 A | * | 10/1987 | Lunn | 110/165 A |
| 4,723,767 A | * | 2/1988 | McPherson et al. | 269/32 |
| 4,770,401 A | * | 9/1988 | Donaldson | 269/246 |
| 4,971,301 A | * | 11/1990 | Yang | 269/153 |
| RE35,605 E | * | 9/1997 | Nomaru et al. | 269/242 |
| 5,915,898 A | * | 6/1999 | Pfister | 269/95 |
| 6,102,383 A | * | 8/2000 | Tunkers | 269/24 |
| 6,354,580 B1 | * | 3/2002 | Nagai et al. | 269/243 |

FOREIGN PATENT DOCUMENTS

| EP | 0 243 599 | 11/1987 |
| EP | 0 348 802 | 1/1990 |
| EP | 0 919 338 | 6/1999 |
| EP | 0 976 482 | 2/2000 |
| FR | 2 755 049 | 4/1998 |
| FR | 2 776 858 | 10/1999 |
| FR | 2 781 176 | 1/2000 |
| FR | 2 781 400 | 1/2000 |

* cited by examiner

*Primary Examiner*—Robert C. Watson
(74) *Attorney, Agent, or Firm*—Young & Thompson

(57) ABSTRACT

The device includes a mechanism movable at least partially in translation and an electrical actuating element. The mechanism and the electrical actuating element are mounted head to tail, so as to reduce the size of the body of the device.

10 Claims, 5 Drawing Sheets

DEVICE FOR CENTERING AND GRIPPING, PARTICULARLY FOR PIECES OF AUTOMOBILE BODY WORK

FIELD OF THE INVENTION

The invention relates to a device for centering, positioning or gripping, particularly for a piece of automobile body work, of the type comprising a body containing an actuating means and supporting centering means, positioning means or gripping means.

BACKGROUND OF THE INVENTION

It is known to use in the field in question an actuating means constituted by a hydraulic jack, a pneumatic jack, an electric jack or other remotely actuated means which can transmit forces by means of a cable or other suitable flexible connector.

It is also known to use, in the field in question, centering, positioning or gripping means, to position a piece, particularly an automobile body metal sheet, by providing a positioning opening in this sheet of body work or this piece of automobile construction, and by inserting at least one end of the positioning or centering means in this positioning opening.

It is also known to use centering, positioning or gripping means, or holding means, comprising a gripping or holding arm that is applied against or to hold the outside of a sheet of automobile body work or of a piece of automobile construction.

French patent application 98.09549 of Jul. 27, 1998, unpublished as of the date of filing of the present application, discloses a centering and gripping device, particularly for a piece of automotive body work, which comprises a body containing an actuating means adapted to actuate in combination at least one retractable gripping member and at least one centering member containing each retractable gripping member within this centering member. Each gripping member has an end forming a hook and extending radially outwardly downwardly.

This device described in French patent application 98.09549, unpublished as of the date of filing of the present application, comprises a mechanical movement return means. This mechanical movement return means connects said actuating means to the centering and gripping members, so as to move the actuating means in a direction opposite the direction of movement of the centering and gripping means during actuation of the device.

SUMMARY OF THE INVENTION

The invention has for its object to improve the known state of the art, particularly the device described in French patent application 98.09549 of Jul. 27, 1998, not published as of the date of filing the present application, by providing a new electrical control device, adapted to be directly connected to an automatic electric device or a programmable robot, or a computer provided with a suitable interface.

An important advantage of the invention is to construct the device according to the invention as a peripheral directly adaptable to an automatic device, a programmable robot or a computer provided with a suitable interface.

The invention has for its object a device adapted to the positioning, holding or gripping of pieces, particularly sheet metal automobile body work, of the type comprising a mechanism movable at least partially in translation and an electrical actuating means, characterized in that the mechanism and the electrical actuating means are mounted head to tail, so as to reduce the dimensions of the body of the device.

According to other preferable characteristics of the invention:

the electrical actuating means is an electric motor adapted to drive in rotation an actuating portion permitting transforming a rotative movement into a translatory movement, the device comprises a manual unblocking means acting on the mechanism or on the electrical actuating means, the electrical actuating means coacts with an at least one control card adapted to be integrated into the device, a housing containing at least one said control card coacts with the electrical actuating means, the mechanism movable at least partially in translation comprises a portion blocked in rotation and movable in translation by screwing or unscrewing a configuration coacting with a drive nut or a screw-threaded shaft driven in rotation by the electrical actuating means, the electrical actuating means is an electric motor of which one shaft end carries a pinion engaging with a toothed wheel connected to said mechanism, the toothed wheel connected to said mechanism is mounted on two bearings disposed on opposite sides of the toothed wheel, according to a first modification of the invention, said mechanism is an indexing or "guide carrier", according to a second modification of the invention, said mechanism is a mechanism for immobilization by pinching, according to a third modification (not shown) of the invention, said mechanism is a gripping mechanism.

BRIEF DESCRIPTION OF THE INVENTION

The invention will be better understood from the description which follows, given by way of non-limiting example with reference to the accompanying drawings, in which.

DETAILED DESCRIPTION OF THE PREFERRED EMBODIMENTS

Figure 1:
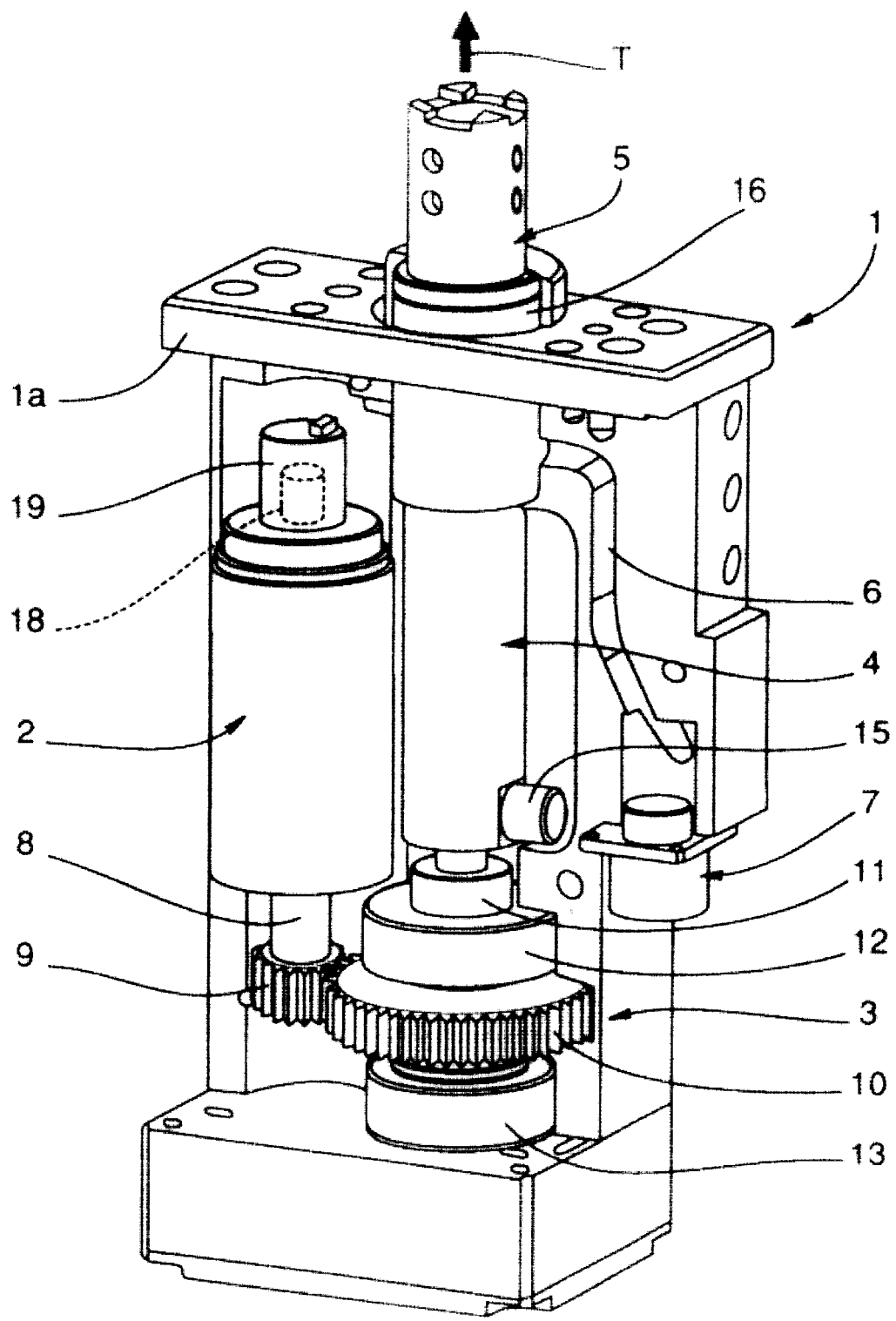
FIG. 1 shows schematically a perspective view, with parts of the body broken away, of a device according to the invention.
Figure 2:
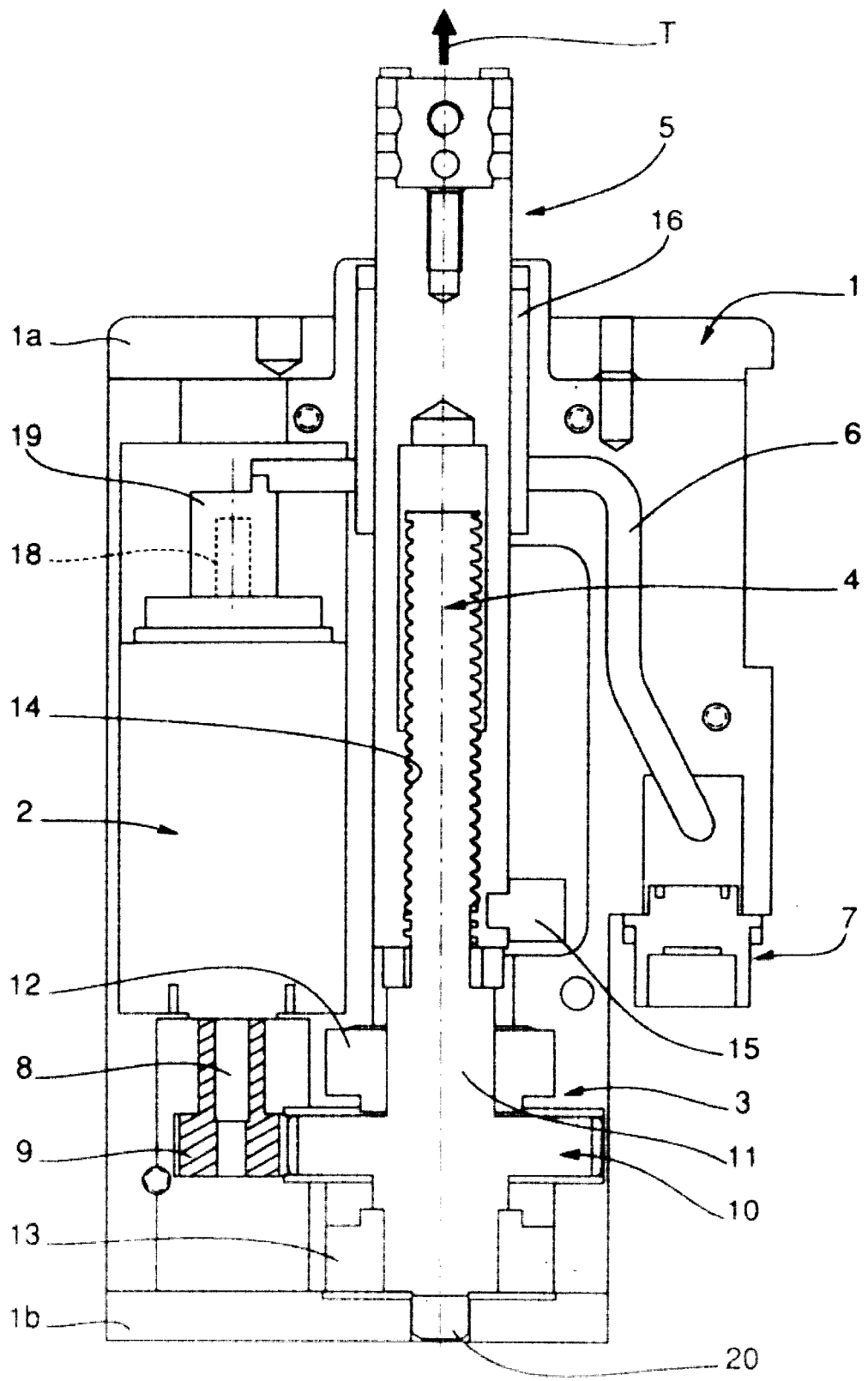
FIG. 2 shows schematically a view in partial cross section on a plane containing the axis of the actuating means and a parallel axis of displacement of the device of FIG. 1.

With reference to FIGS. 1 and 2, a first embodiment of the invention comprises a body 1 machined to receive permanently and to secure by suitable means, an electric actuating motor 2 and a drive assembly 3 connected to a screw-threaded actuating rod 4, adapted to actuate the movement of a guide assembly 5, to position a piece of automobile body work (not shown).

The body 1 comprises an upper surface 1a for mounting on a fixed frame (not shown) and has the shape of a housing receiving the electric motor 2 supplied by a power and signal transmission cable 6, connected to a source of energy or of outside control by means of an electric connection 7 for power transmission and for measurement and control signals.

The end 8 of the shaft of electric motor 2 receives a keyed pinion 9 adapted to engage with the toothed wheel 10 of the actuating assembly 3. The actuating assembly 3 comprises a screw-threaded rod 4 secured to an enlarged portion 11 permanently receiving the toothed wheel 10. The enlarged portion 11 is mounted in two bearings 12 and 13 disposed on opposite sides of the toothed wheel 10.

The movable "guide carrier" assembly 5 comprises an internal tapping with a trapezoidal thread 14 coacting with the threaded drive rod 4. The lower portion of the guide carrier assembly 5 comprising the tapping 14 also carries an anti-rotation member 15, ensuring the linear displacement of the guide carrier assembly 5 during relative screwing of the screw-threaded rod 4 in the tapping 14 forming a nut movable in translation.

The smooth bearing 16 for sliding is provided for translation in the direction of the arrow T of the guide carrier assembly 5.

So as to obtain compact and economical manufacture, as well as an anti-blocking effect during untimely stopping or accidental energy cutoff, it is provided that the electrical motor 2 is mounted head to tail relative to the guide carrier assembly 5, whose movement it ensures. It can also preferably be provided that the electrical motor 2 comprises a second outwardly extending shaft end 18 inserted in an optical or incremental coder 19 permitting the continuous control of the motor, and as a result of the displacement in translation T of the guide carrier assembly 5.

In case of undesirable blocking of the mechanism, this device also permits actuating the guide carrier assembly 5 directly, or by means of the actuating assembly 3, subject to a mechanical action on one end 20, accessible from the exterior, of the body 1, without disassembling the body 1.

The end 20 can for example have a screw-shaped configuration, a hollow hexagonal shape or any other hollow or relief shape adapted to permit a control that will be manual, or by means of an external tool, of the assembly 3 and of the guide carrier 5 adapted to move in translation in the direction of the arrow T.

Moreover, this arrangement permits, in this case, controlling simultaneously the rotation of the rotor of the motor 2, and as a result the angular position of the motor 2 connecting in rotation to the movement of the assembly 3.

Thus, during resumption of the electrical supply, the positioning of the device according to the invention will be recoverable with exactitude by an intelligent control center connected to the electric connection 7.

This arrangement accordingly permits computer control of the device according to the invention in combination with other means usable with automobile body work, with complete safety, because the instantaneous position of the guide carrier corresponds to a single corresponding position of the motor 2 that can be interpreted by a computer, a programmable robot or equivalent "intelligent" means.

Figure 3:
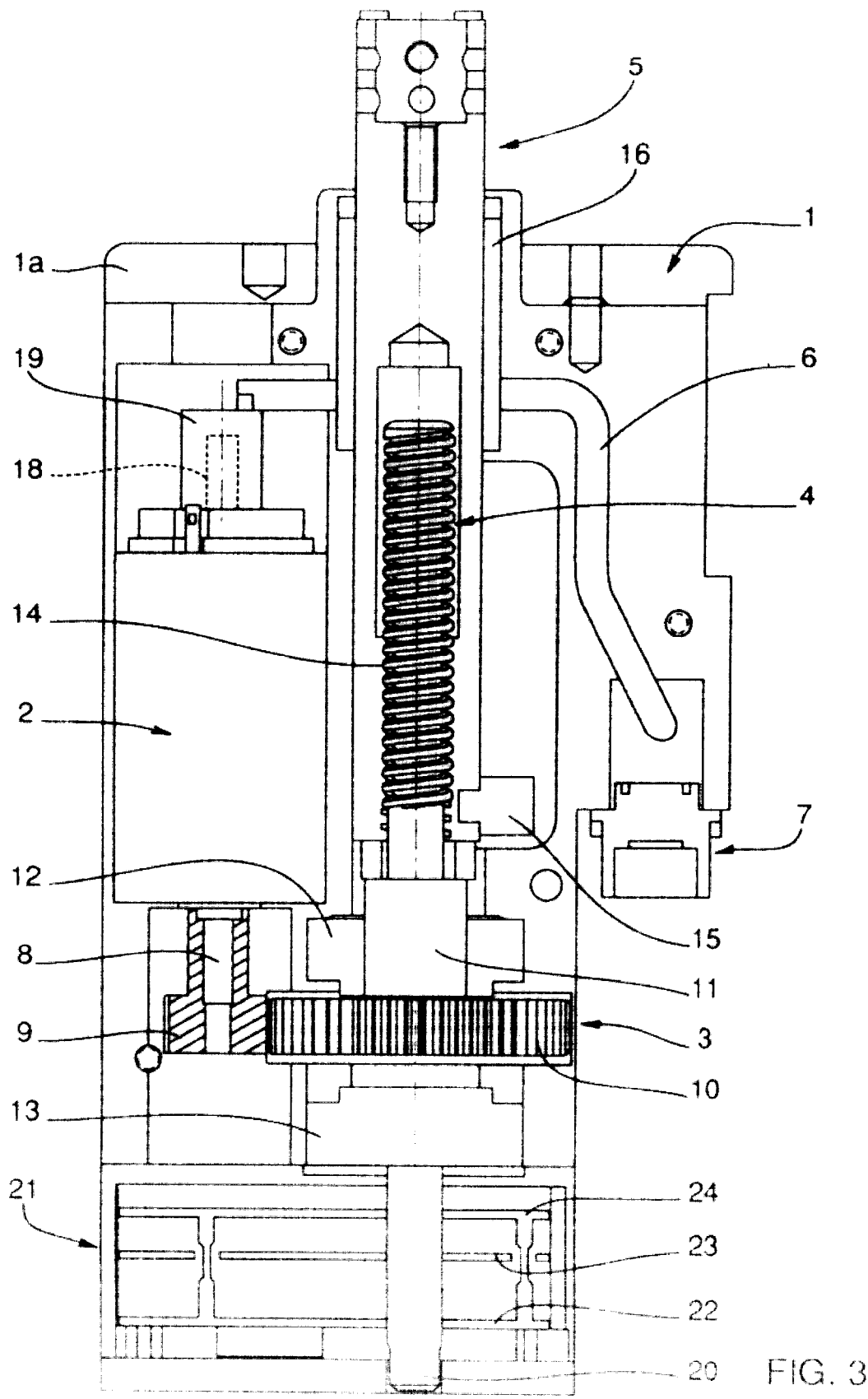
FIG. 3 shows schematically an elevational view in fragmentary cross section similar to FIG. 2, of another device according to the invention.
Figure 4:
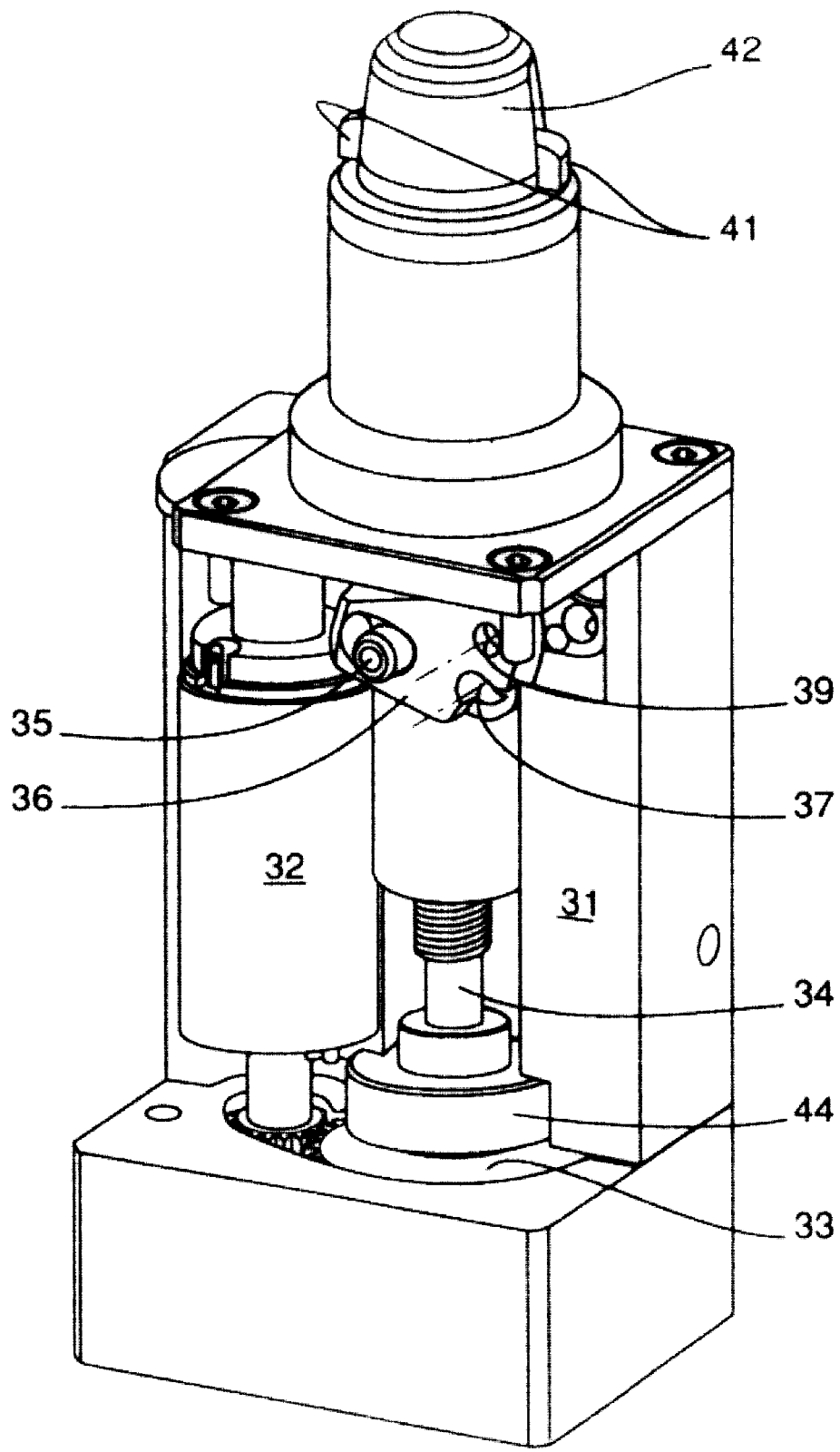
FIG. 4 shows schematically a perspective view, with parts of the body broken away, of a third embodiment of the device according to the invention.

With reference to FIG. 3, elements that are identical or functionally equivalent to the elements of FIGS. 1 and 2 have the same reference numerals as those of FIG. 1 and 2.

In this embodiment, the lower plate 1b of the body 1 of the device is replaced by a housing 21 containing control cards and circuits 21 to 24. The control cards or circuits 21 to 24 permit fashioning the device according to the invention as an "intelligent" device, directly addressable by a computer or by a programmable robot. To this end, there can also be provided on the extending end of the shaft 20 of the actuating assembly 3, characteristic marks or scratches adapted to be read by a rotatable coder, so as to verify the absence of missing or broken teeth on the pinion 9 of the toothed wheel 10.

Other modifications can be envisaged, in which the connection 7 is disposed at the side of the control cards 22, 24 which preferably comprise in this case a supplemental power card.

With reference to FIGS. 4 to 7, another embodiment of the invention comprises a body 31 machined to receive a mobile assembly and an electrical motor 32.

The electrical motor 32 drives by gearing an externally toothed nut 33. The nut 33, movable in rotation, moves a screw-threaded rod 34 movable in translation, which permits moving in translation a centering and gripping assembly similar to that described in unpublished French patent application 98.09549 of Jul. 27, 1998. The screw-threaded rod 34, upon moving, thus acts in the manner of a piston causing the movement in the reverse direction of the centering and gripping members.

Figure 5:
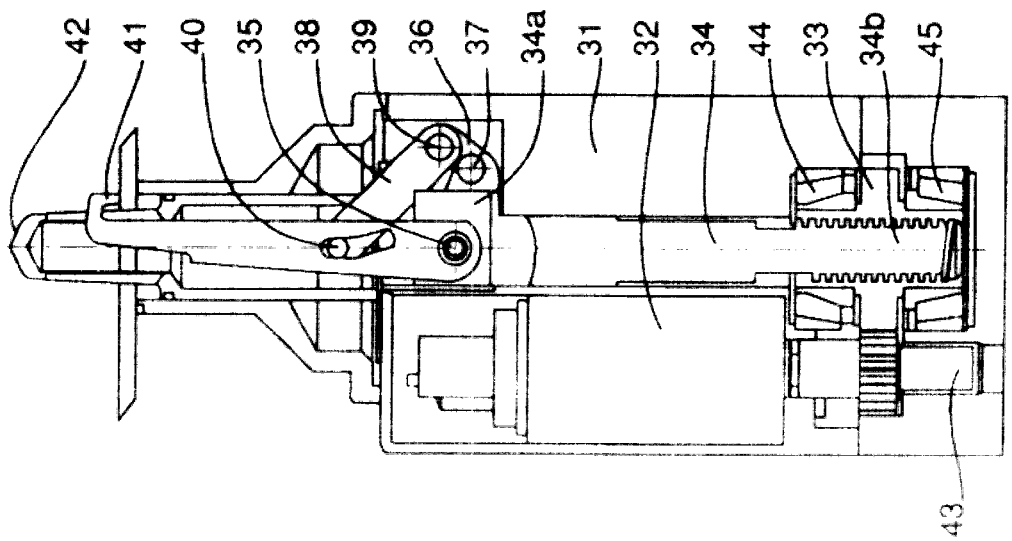
FIG. 5 shows schematically an elevational view partially in cross section of the device according to the invention of FIG. 4, in a use position.

In the position of FIG. 5, a metal sheet is gripped and centered by the device according to the invention. In this position, the upper end of the screw-threaded rod 34, movable in translation thanks to an anti-rotation mounting, is screw-threaded at its lower end 34b to coact with the screw 33. The member 34 comprises at its upper end a head 34a.

The head 34a is articulated with substantial play on a through axle 35 with which a T-shaped member 36 mounted on is an axle 37 fixed in the body, and also carrying a lever 38 articulated at 39 on the T-shaped member 36.

The lever 38 comprises at its end opposite its axis 39 of articulation, a control axle 40 for the entry and outlet of the pinching members 41 of the device.

The operation of the device is analogous to the operation described in French patent application 98.09549 of Jul. 27, 1998 which is considered as incorporated by reference into the present application.

Thus, the movement of the T-shaped member 36 caused by translation of the member 34 gives rise both to the re-entry of centering member 42 and the retraction of the pinching member of members 41.

Thus, the fact of inserting the return member 36 to control the movements of the centering member 42 and the gripping member 41, produces a movement in translation of the centering member 42 opposite to the movement in translation of the piece 34 that is movable in translation.

Figure 7:
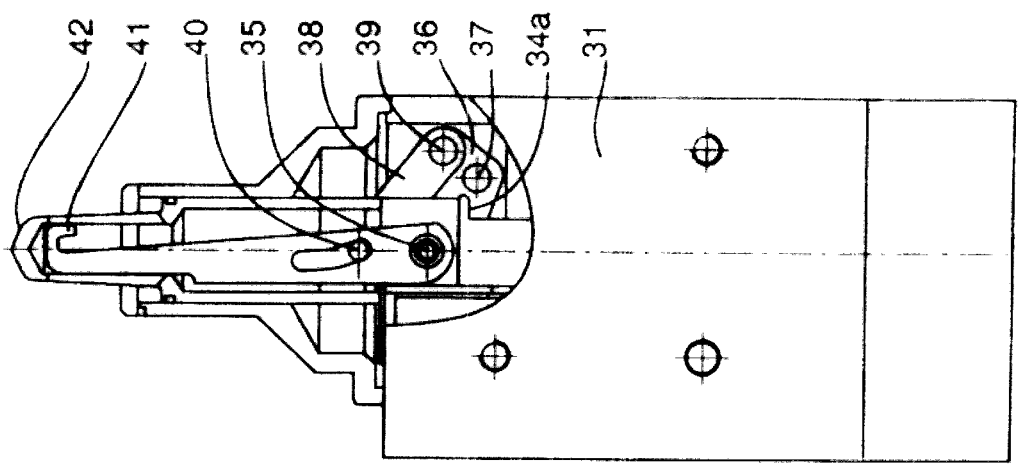
FIG. 7 shows schematically an elevational view with parts broken away and partially in cross section, of the device of FIG. 4 in a retracted position.
Figure 6:
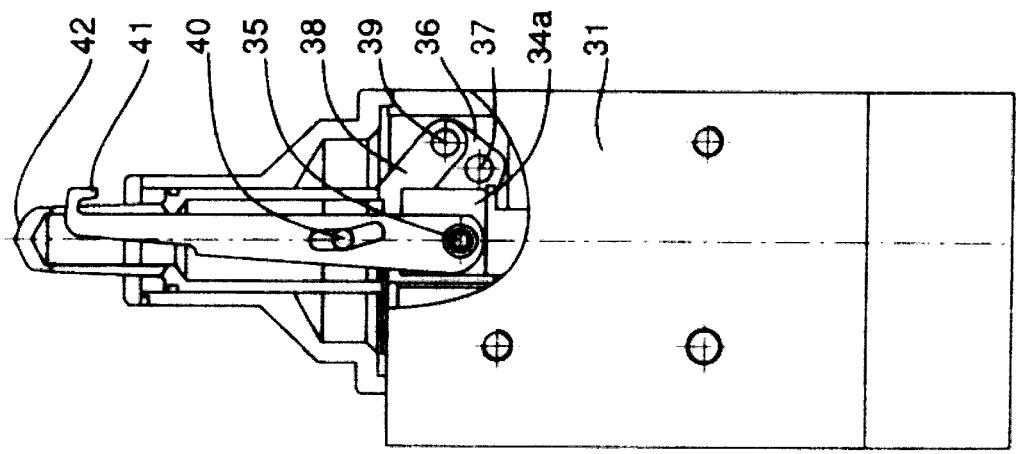
FIG. 6 shows schematically an elevational view with parts broken away of the device of FIG. 4 in an intermediate position.

This has the result that the axle 35 of articulation and the end of the centering member 42 move toward each other during movement of the device carried out according to the sequence shown in FIGS. 5 to 7.

For a more detailed operation of the corresponding mechanism, reference is made to French patent application 98.09549 of Jul. 27, 1999, unpublished, which is considered as incorporated by reference into the present application.

In this embodiment, according to the invention, the electrical drive means 32 is mounted head to tail relative to the actuating member 34 which gives rise to the operation of the mechanism of the device.

This arrangement permits obtaining a compact production, which is simple and economical, whilst ensuring self-blocking in case of cutoff of the electrical supply or untimely stopping.

In this embodiment, there can be provided manual unblocking by acting on an end 43 of the extending shaft end of the electric motor 32. Instead of mounting the actuating portion 33 driven in rotation in bearings such as the bearings 12 and 13 of FIGS. 1 and 2, it can be provided in this case to mount the actuating part on roller bearings 40, 45, designed as a function of the demultiplication ratio and of the actuating forces engendered, and disposed on opposite sides of the toothed wheel 33 forming the drive nut of the actuator 34 movable in translation.

The other advantages of the invention are also preserved, namely the possibility of completing the device shown in FIGS. 4 to 7 with an "intelligent" housing (not shown) permitting to constitute this embodiment as a computer peripheral, as a programmable robot or as an equivalent object.

The invention described with reference to three particular embodiments is in no way thereby limited, but on the contrary covers any modification or shape and variation of production within the scope and spirit of the invention.

Thus, the invention can also be applied to devices known as "grippers", in which an arm is actuated to grip or maintain a piece of automotive body work or an element usable for automotive construction.

The compactness of the device also permits envisaging the reduction of the steps of production, by designing a modular body adapted to receive a standard electric motor 2 or 32, which can be provided with drive equipment and if desired an "intelligent" command housing, whilst a reservation is foreseen to mount if desired mechanism ensuring the operations of gripping, positioning, holding or another useful mode of immobilization during automotive production.

The head to tail mounting is particularly advantageous, as well as the arrangement consisting in providing an "intelligent" housing, which can be adapted with simple modification to a modular body of a device according to the invention.

What is claimed is:

1. Device for positioning, holding or gripping of pieces of automobile body work, the device comprising a mechanism movable at least partially in translation and an electrical actuating means (2, 32), wherein the mechanism is mounted adjacent to the electrical actuating means (2, 32) and the longitudinal axis of the electrical actuating means is substantially parallel to the longitudinal axis of the mechanism, so as to reduce the size of the body (1, 31) of the device, wherein the electrical actuating means is an electrical motor (2, 32) of which one shaft end carries a pinion (9) engaging with a toothed wheel (10, 33) connected to said mechanism, wherein the toothed wheel (10, 33) connected to said mechanism is mounted on two bearings (11, 13; 44, 45) disposed on opposite sides of the toothed wheel (10, 33), wherein the mechanism and the electrical motor (2, 32) are received in a body (1) comprising an upper mounting surface (1*a*) and a lower plate (1*b*) or block; wherein the electrical motor (2, 32) and the mechanism are mounted below the upper surface (1*a*); the pinion (9) and the toothed wheel (10, 33) are mounted near the lower plate (1*b*) or block; and wherein the actuating assembly (3) of the mechanism comprises a threaded rod (4) secured to an enlarged portion (11) integral with the toothed wheel (10).

2. Device according to claim 1, characterized in that the electrical actuating means is an electrical motor (2, 32) adapted to drive in rotation an actuating portion (4, 34) permitting transforming a rotative movement into a translatory movement.

3. Device according to claim 1, characterized in that the device comprises a means (20) for manual unblocking, acting on the mechanism.

4. Device according to claim 1 characterized in that the electrical actuating means (2, 32) coacts with at least one control card (22, 23, 24) adapted to be secured to the device.

5. Device according to claim 4, comprising moreover at least one housing (21) containing at least one said control card (22, 23, 24) coacting with the electrical actuating means (2, 32).

6. Device according to claim 1, characterized in that the mechanism movable at least partially in translation comprises a portion blocked in rotation and movable in translation by screwing or unscrewing, the portion having a shape coacting with the threaded rod (4) driven in rotation by the electrical actuating means (2, 32).

7. Device according to claim 1, characterized in that said mechanism is a positioning mechanism.

8. Device according to claim 1, characterized in that said mechanism is a holding mechanism.

9. Device according to claim 1, characterized in that said mechanism is a gripping mechanism.

10. Device according to claim 1, characterized in that the device comprises a means (43) for manual unblocking, acting on the electrical actuating means.

* * * * *